March 29, 1960 R. H. WENDT 2,930,045
METHODS OF MAKING NECKTIES
Filed March 17, 1958 6 Sheets-Sheet 1
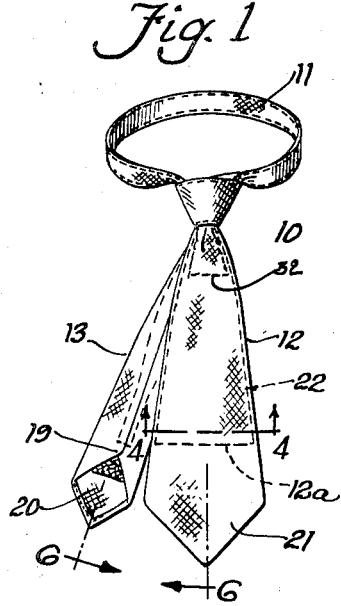
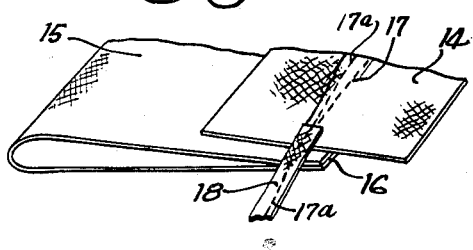
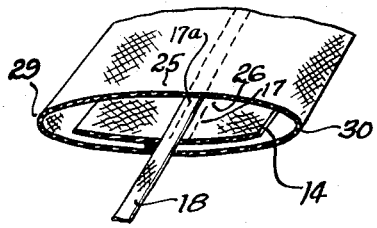
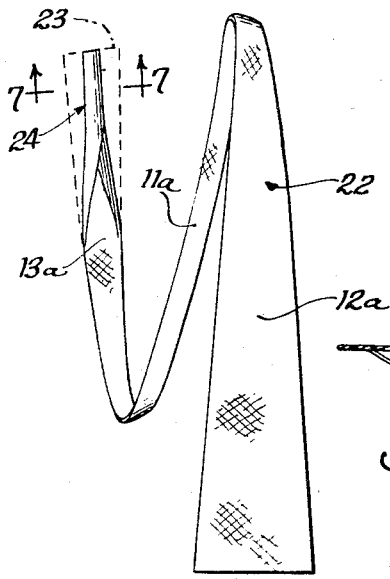
INVENTOR.
Robert H. Wendt.

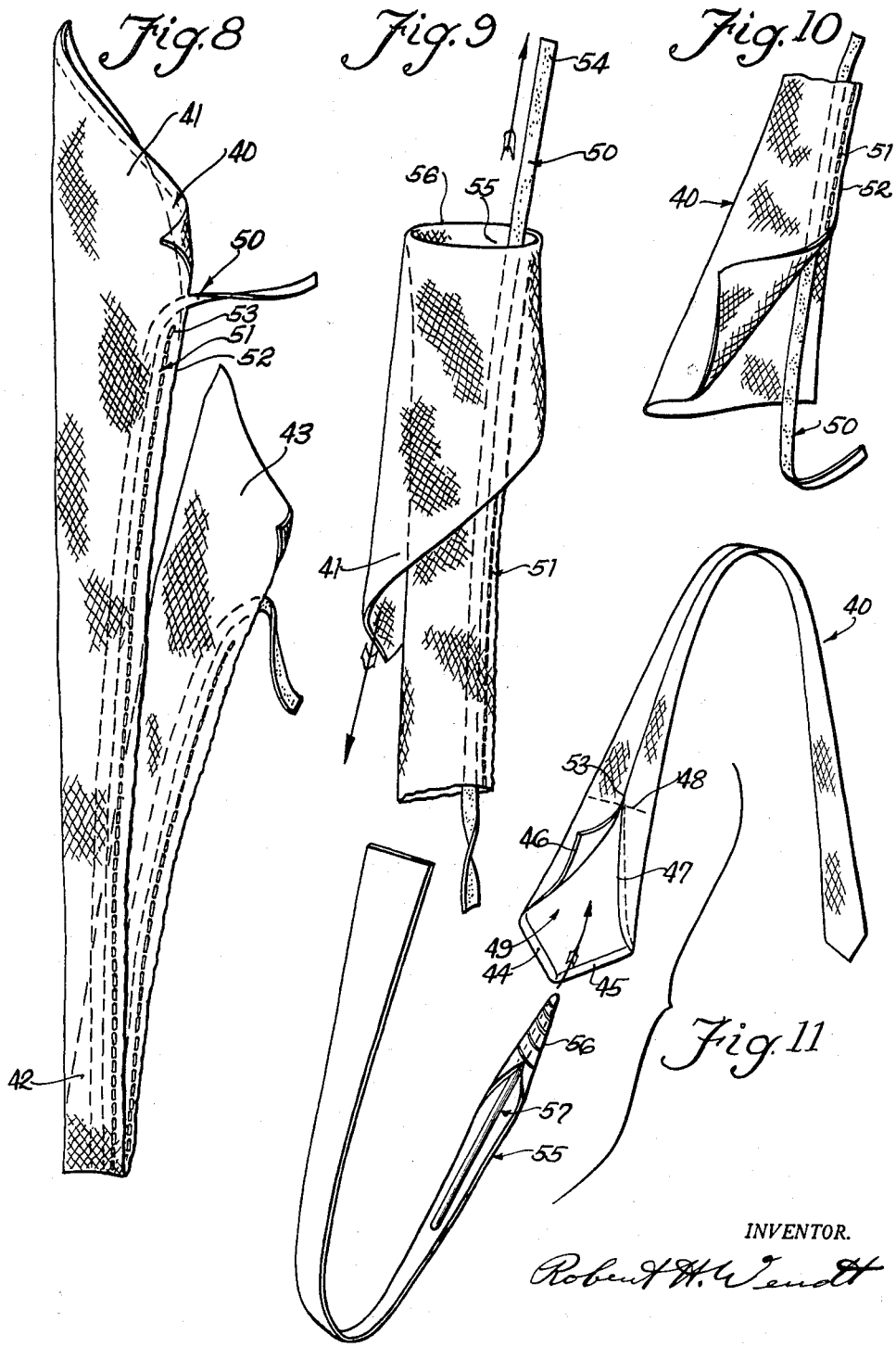

March 29, 1960 R. H. WENDT 2,930,045
METHODS OF MAKING NECKTIES
Filed March 17, 1958 6 Sheets-Sheet 3
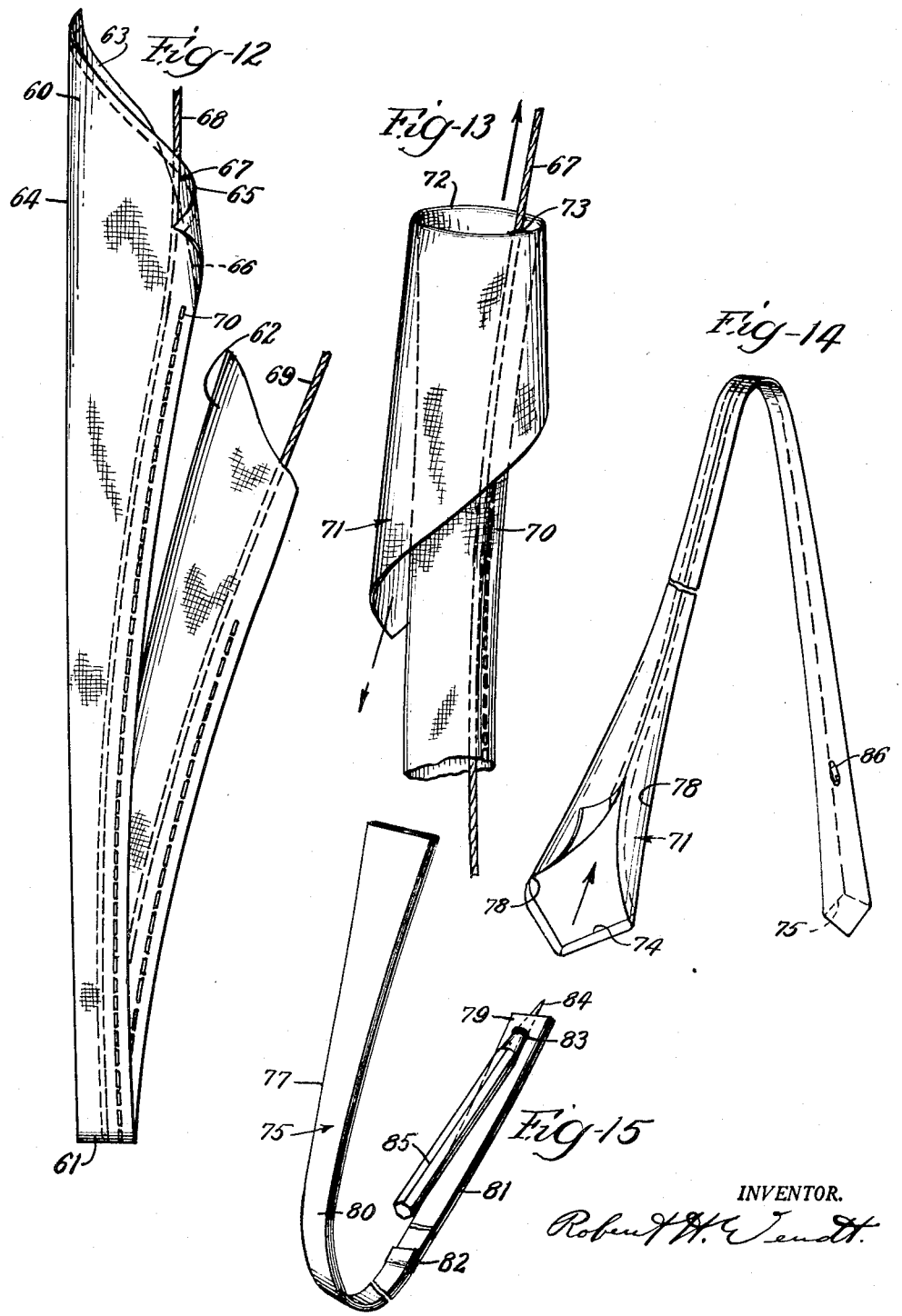
INVENTOR.
Robert H. Wendt March 29, 1960 R. H. WENDT 2,930,045
METHODS OF MAKING NECKTIES
Filed March 17, 1958 6 Sheets-Sheet 4
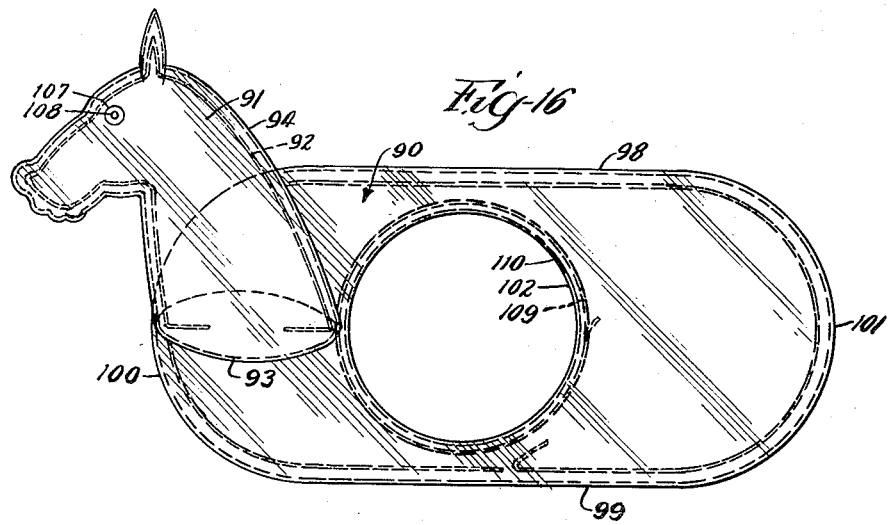
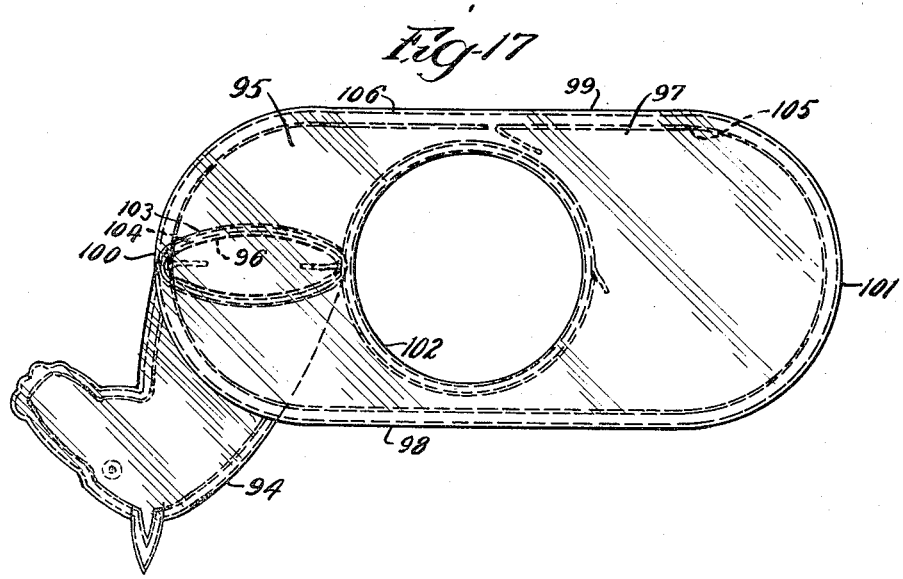
INVENTOR.
Robert H. Wendt March 29, 1960 R. H. WENDT 2,930,045
METHODS OF MAKING NECKTIES
Filed March 17, 1958 6 Sheets-Sheet 5

INVENTOR.
Robert H. Wendt

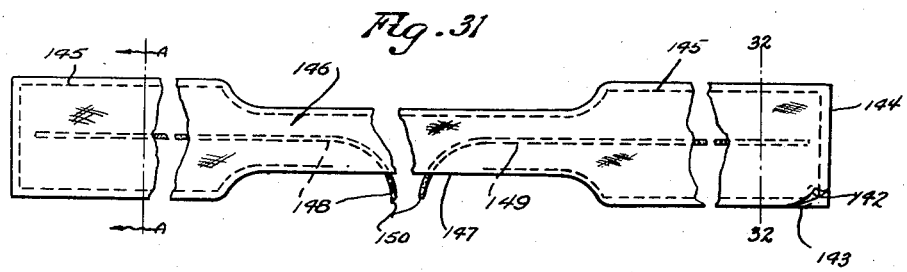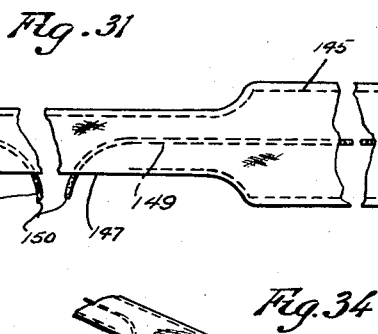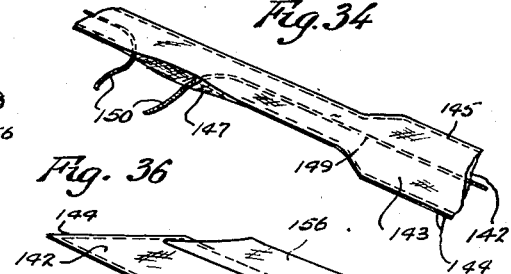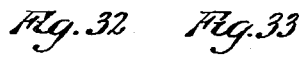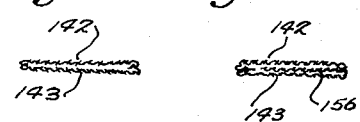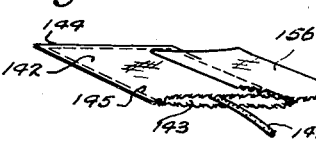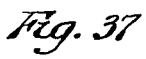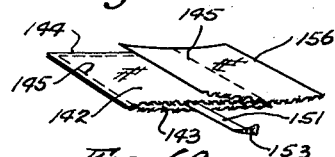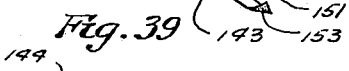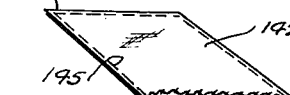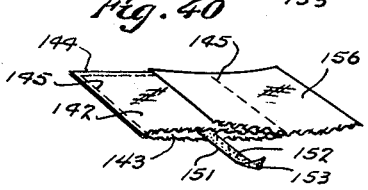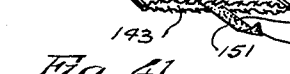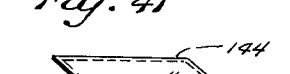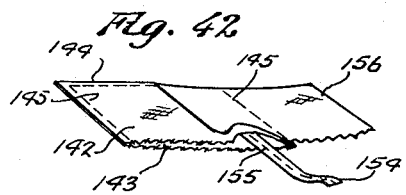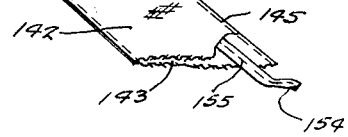

United States Patent Office 2,930,045
Patented Mar. 29, 1960

2,930,045

METHODS OF MAKING NECKTIES

Robert H. Wendt, Evanston, Ill.

Application March 17, 1958, Serial No. 737,466

26 Claims. (Cl. 2—146)

The present invention relates to methods of making neckties. This application is a continuation-in-part of my prior application, Serial No. 166,706, filed June 7, 1950, on Neckties of the Four-in Hand Type, and of my prior application, Serial No. 497,094, filed March 28, 1955, Neckties and Other Hollow Articles and Methods of Making Them, the latter application being allowed, but which is now abandoned in favor of this application.

One of the objects of the invention is the provision of an improved filler for neckties of the four-in-hand type which may be inserted after the ties are completed, and which is suitably tapered and formed with an integral needle portion for this purpose, the taper being complementary to that of the sheath of the tie, and the filler being suitably stiffened so that a pull on the smaller end of the filler, while holding the larger end of the sheath, causes the tapered filler to spread the tie into smooth unwrinkled condition, where it is so held and maintained, even while tied into a four-in-hand knot.

Another object of the invention is the provision of improved methods of making ties of the four-in-hand type and improved methods of conditioning such ties and maintaining their smooth unwrinkled condition without necessity for pressing.

Still another object of the invention is the provision of an improved tie structure which is adapted to form four-in-hand knots of a predetermined size, all of the parts of which maintain the smoothness of the sheath, which is curved with filler, but which is distinguished by an absence of wrinkles of any kind.

Another object of the invention is the provision of improved ties of the four-in-hand type which will last longer, which maintain a more neat, smooth, and pressed appearance at all times, which are easier to tie, and which maintain the knots that are placed in them in a better manner than the ties of the prior art.

Another object is the provision of improved methods of basting, seaming, and inverting hollow articles, such as neckties, or inflatable flexible plastic devices.

Another object is the provision of improved methods of making or inverting bow ties, tubular belts, umbrella cases, four-in-hand ties, and other similar articles.

Another object is the provision of improved fillers for ties, and improved neckties, which are more durable, which include a minimum number of parts, which are simple in construction, which may be manufactured more economically, and which present a better appearance and better service than the ties of the prior art, for a long period of time with minimum care.

Another object is the provision of an improved flexible plastic filler for old or new existing neckties which may be transparent so that it will be invisible as compared with the color of the sheath or it may be white or of color similar to the sheath, and which is stiff enough edge to edge and so tapered that it may fit in any four-in-hand tie and engage the inside edges of the sheath to remove the wrinkles and improve any existing tie.

Other objects and advantages of the invention will be apparent from the following description and the accompanying drawings, in which similar characters of reference indicate similar parts throughout the several views.

Referring to the six sheets of drawings;

Fig. 1 is a front elevational view of a four-in-hand tie embodying the present invention, shown as it is tied;

Fig. 2 is a fragmentary view in perspective of the sheath and conventional liner, shown during one of the steps of the manufacture of the tie;

Fig. 3 is another fragmentary view in perspective, showing the appearance of the tie after the structure of Fig. 2, has been sewed and turned inside out;

Fig. 4 is a cross-sectional view, taken on the plane of the line 4—4 of Fig. 1, looking in the direction of the arrows;

Fig. 5 is a plan view of the present tie spreading and filling member, shown in a partially folded condition;

Fig. 6 is a fragmentary sectional view, taken on the plane of the line 6—6 of the tie of Fig. 1;

Fig. 7 is a sectional view, taken on the plane of the line 7—7 of Fig. 5, looking in the direction of the arrows;

Fig. 8 is a view in perspective, illustrating the first step of one of my preferred methods of necktie manufacture;

Fig. 9 is a similar fragmentary view, illustrating the second step;

Fig. 10 is another fragmentary view, illustrating one of the preliminary operations;

Fig. 11 is an exploded view, showing the method of insertion of the tie spreader or filler;

Fig. 12 is a view similar to Fig. 8, showing a modified method and tie construction;

Fig. 13 is a view similar to Fig. 9, on this construction;

Fig. 14 is a view similar to part of Fig. 11, showing the sheath of this modification;

Fig. 15 is a view similar to the lower part of Fig. 11, showing a modified stiffener and filler ready to be inserted in the device of Fig. 14;

Fig. 16 is a view in perspective of the top of an inflatable member constructed according to the invention, and illustrating the method of making it;

Fig. 17 is a view in perspective of the bottom of Fig. 16;

Fig. 31 is a fragmentary plan view of a sheath for a bow tie, after stitching, but before inverting the sheath;

Fig. 32 is a sectional view taken on the plane of the line 32—32, of Fig. 31, but showing the sheath after it has been inverted;

Fig. 33 is a view similar to Fig. 32, after the filler has been inserted in the sheath of the bow tie;

Fig. 34 is a fragmentary view in perspective of the sheath of Fig. 31;

Fig. 35 is a fragmentary view in perspective with a section on the plane of the line A—A of Fig. 31, looking in the direction of the arrows;

Fig. 36 is a view similar to Fig. 35, but including a fabric liner;

Fig. 37 is a similar view of a modification, showing the making of a bow tie, using an inverting strip with adhesive on one side;

Fig. 38 is similar to Fig. 37, but includes a fabric filler;

Fig. 39 is a similar view of a modification using a strip with adhesive on both sides;

Fig. 40 is similar to Fig. 39, but includes a fabric filler;

Fig. 41 is a similar view of a modification, using a stitched inverting strip; and Fig. 42 is a similar view of another modification, similar to Fig. 41, but including a fabric filler.

Figure 18:
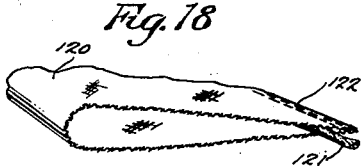
Fig. 18 is a fragmentary view in perspective of the sheath and inverting member showing their arrangement when a thread with contact adhesive is used.
Figure 23:
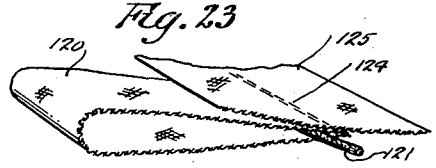
Fig. 23 is a similar view like Fig. 18, except that it includes a fabric liner.

Referring to Fig. 1, 10 indicates in its entirety, the tie assembly embodying the invention, which is tied into a four-in-hand knot for the purpose of illustration. The parts of such a tie, having regard to its length, are the relatively narrow central neckband portion 11, the relatively wide facing and knot tying portion 12, at the large end of the tie, and the relatively narrow, yet tapered slipping portion 13, at the other end of the tie, which passes through the knot, and upon which the user pulls to draw the knot tightly against the collar.

The present invention may be employed in ties of any length and width and ties of practically any suitable material. The choice of material and the choice of the tie's proportions depends upon the cost permissible in such an article and the materials available; and the present invention is applicable to all sizes and grades of ties, in which there is a marked improvement by the use of the present structures. The pattern of which the tie is made must, therefore, be an elongated strip of a suitable fabric, such as silk or rayon, for the sheath, the strip being tapered backwardly from its large end and inwardly from its smaller end, and being in general, twice as wide as the width of the proposed tie, with an additional allowance of a quarter of an inch or more at each edge of the pattern for the seam.

The liner, which is indicated at 14 in Fig. 3, should be substantially as wide as the inside of the tube of the tie; but for the present invention it is not important whether the liner does adequately fill the tube. The blank for the sheath, indicated in its entirety at 15, may then be folded with the outside in; and the liner 14 may be laid longitudinally of the edges 16 so that the center of the liner is located along the proposed line of stitching 17. The tie casing is preferably cut on the bias to make its edges conform to any knot.

Thereafter a single line of stitching at 17 may be employed to sew together the edges of the sheath along the line of stitching 17 and the center of the liner 14. In order to facilitate the turning inside out of the structure shown in Fig. 2, a cord 18 may be laid inside the reversed tube 13 and may have its end so arranged that it is sewed in with an extra line of weak stitching 17a at the point 19 (Fig. 1), which is the smaller end of the tie. Such a cord 18, extending all the way through the tube 15, is of great assistance in turning the structure of Fig. 2 inside out. The stitching of cord 18 is made weaker by wide stitches or weak thread or both so it can be ripped out.

The tie should then be pressed; and it will assume substantially the form of Fig. 3, and is complete except for the providing of the lining at the points 20 and 21 on the rear side of each end of the tie and for finishing these ends of the tie sheath by turning the edges in and sewing them to the liner. The attachment of the liner may also be done by the turning inside out and stitching on the sewing machine, and then turning right side out again, thereby eliminating such hand work.

Referring to the tie structure of Fig. 3, except for the method of its making, this structure does not differ substantially from the prior art ties, which usually are hand stitched along the center of the liner 14, and which, therefore, are not as well made as the proposed structure. One of the most important features of improvement of the present four-in-hand tie lies in the use of the combined stiffener and spreader 22, shown in Fig. 5.

The cord 18, which extends through the inverted tube 15, is preferably a narrow tape of fabric which is double the length of the necktie tube; and when sewed as described, is secured to the smaller end of the tie and liner at the middle of the tape.

When the tie is pulled inside out, the other end of the tape will be pulled into the tube and may be used for the insertion of the stiffener and spreader, further to be described.

Cord or tape 18 is preferably separately stitched or secured to the inside of the casing, that is, to its eventual face. This separate stitching rips as the tape is pulled out; and the tie turns right side out. This action is illustrated in Fig. 9 in connection with a modification.

The stiffener and spreader may comprise an elongated tape of stiff woven fabric, which is reinforced with an impregnating layer of a modern plastic on one or both sides. Such a layer of plastic provdies a stffener 22 which is still bendable in either direction, but is stiff enough to spread the tube of the tie into a smooth condition over its full width by engagement of the stiffener edges with the inside of the tube. The stiffener includes the lower wider portion 12a, which is complementary to the inside of the face and knotting portion 12. The stiffener tapers down to the neckband portion 11, which has parallel edges and is substantially as wide as the inside of the tube of the tie at the neckband 11.

From the neckband portion 11a of the stiffener the stiffener may increase in width for the knot slipping portion 13a, thus giving a wider lower end 23 to provide sufficient material to roll this end into an integral needle portion 24. The needle portion 24 comprises a spiral laterally rolled portion preferably including a plurality of layers, as shown in Fig. 7, so that the needle portion 24 is definitely stiff and unbendable because of its spiral layers and tubular form.

The present stiffener and spreader is only applicable to ties which are characterized by the absence of stitching between the face 25 of the tie and the liner 14, as shown in Fig. 3. This leaves an open tube below the face of the tie and above the liner 14, into which the stiffener and spreader 22 can be inserted. Another way to provide a needle portion is to insert a pencil point 24a in an aperture 24b (which is too small to pass the pencil) in the small end of the stiffener 22a.

The needle portion 24 of the tie may be formed by rolling this wide end portion of the tie about a very small mandrel and applying heat, which melts the plastic until it acts like a cement to secure the parts in the form of a stiff tube. In other embodiments, where the plastic is not heat meltable, a suitable cement or solvent may be used to weld the parts of the tube together. The needle tube is preferably formed temporarily by rolling the smaller end of the spreader into a tubular shape, and securing it with a small rubber band about the tube.

Insertion may be made before the tie is sold and while it is in the factory, if desired; but the present device is peculiarly adapted to be detachable and to be applicable to ties which are already on the market or in the wardrobe of the user.

The method of insertion is as follows:

The needle portion 24 is inserted in the tubular opening 26 at the larger end of the tie; and for this purpose it may be necessary to disarrange the rear lining with which the back of the larger ends of the tie is faced.

The needle portion having been inserted, it is caused to progress; and the tie is wrinkled backward upon it until a new grip of the needle portion is secured through the tie, and then the wrinkled portion is pulled smooth over the stiffener by pulling on the large end of the tie. This procedure is followed until the larger tapered end portion 12a of the stiffener and spreader engages the inside edges of the tube substantially as shown at 27, 28 in Fig. 4.

The stiffener and spreader acts like a wedge in the complementary tapered facing portion 12 of the tie, forcibly spreading it to a smooth, unwrinkled condition, where it is so held without pressing.

In some embodiments of the invention the user may prefer to retract the wider lower portion 12a of the stiffener to such a position that the edges of the tube, as indicated at 29 and 30, are spaced slightly from the stiffener, giving a more flexible knot, which is not so tailored as it would be with the structure of Fig. 4. This is merely a matter of taste.

When the stiffener is moved to the position of Fig. 4, with its edges contacting the inside of the sheath, the sheath must perforce be held smooth; and a knot may be tied absolutely without wrinkles, if the knot is not pulley too tightly. The size of the knot then does not depend upon how many turns are taken by the wearer; but the knot will be of suitable shape and size with a single or a double turn; and it may be made large or small by using larger or smaller portions of the tie to form the knot. At the end of the day, when the tie is removed, it will be found that the knot slips off very readily without wear and without wrinkling the tie. It may be spread out into a smooth condition; and the stiffener and spreader should be pulled at its needle end 24, while holding the larger end 21 of the tie to assure the tie being smooth for the next wearing.

Various types of stiffeners and spreaders may be employed, the preferred type being a heavy tape with a heat meltable plastic applied to one side. Among the suitable plastics are methyl methacrylate, vinylidene chloride resins, polyvinyl formal resins, polyvinyl butyral resins, vinyl alcohol resins, allyl resins, polystyrene, polyethylene, polyamide, ethylcellulose, cellulose acetate or cellulose acetate butyrate. In some embodiments of the invention I may dispense with the woven fabric of the stiffener and utilize a strap of flexible, yet slightly stiff, modern plastic which is in the form of a strip of sheet material suitably tapered in shape, as shown in dotted lines in Fig. 1.

A plurality of thin layers of plastic film, such as vinylite film, may be used to form a laminated filler of any desired stiffness.

In case the plastic is not heat meltable, its tapered small end may, nevertheless, be rolled tightly to form a needle portion and secured with cement or transparent tape of the type having a pressure responsive adhesive. After the stiffener has been inserted, the rolled needle portion may be flattened out again; and the stiffener may be of such length relative to the tie that it may terminate at the point 32 (Fig. 1) and present a flat, stiff enlargement of increasing size below the knot, to prevent the knot from coming loose about the neck of the wearer.

The operation of the stiffener and spreader is as follows:

Those who prefer a relatively small and narrow knot may make the knot farther up into the neckband portion 11, while using the stiffener and spreader pulled into the position of Fig. 1, where it engages with its edges inside the tube of the tie.

Others may prefer to make smaller knots by retracting the tapered spreader 22 until its wider portion 12a has its edges slightly spaced from the inside of the tie tube. This permits the making of a smaller knot because the knot uses a narrower portion of the stiffener and spreader.

In any event, when the tie is removed, the stiffener and spreader, being loose and movably mounted, a pull may be exerted upon the end 13a at the needle portion 24, while holding the lower, larger end of the tie at the lining 21. The tapered spreader 22 then acts as a wedge as it moves into the tube of the tie to the position shown in dotted lines in Fig. 1, in which the relatively stiff spreader places the face of the tie under lateral tension, spreading it and smoothing out all wrinkles and holding the tie in a smooth condition.

This is a result which cannot be accomplished by means of a fixed or stitched lining because such linings are usually not stiff enough; and such linings usually become wrinkled themselves, whereas the present stiffener and spreader will remain unwrinkled for a long time. After from two to four weeks of steady wear, even the present liner may become slightly deformed, when a new one should be employed, if the tie itself is not then worn out or in need of cleaning.

Referring to Fig. 8, this is a view in perspective of a tie casing in the course of its manufacture. The tie casing 40 may be made on the usual pattern, to provide a wider front portion 41, a narrow neck portion 42, and a wider, but smaller, end portion 43, when it is formed into a sheath.

The neck portion 42 is preferably of substantially uniform width, and is made quite narrow so that it may form the neckband of the tie when it is tied. The sheath, when completed, again tapers inwardly from the end portions 41 and 43; and the sheath is preferably made of fabric cut on the bias.

It is quite difficult to fit the edges of such a sheath together and sew them by machine without basting because the usual sewing machines feed the fabric on the lower side and drag against the fabric by means of a shoe on the upper side.

The sheath 40 is first provided with suitable rear facing at each of its larger end portions 41 and 43 on the rear side. This is done by stitching along the edges 44, 45, 46, and 47, but leaving the upper edge 48 of the rear facing unstitched. The tie and facing are turned inside out to apply the facing; and the complete facing is indicated by the number 49. When the tie sheath and facings are again reversed to the right side, the rough edges of the stitched facing and tie will be invisible.

According to my improved method, the sheath is now laid out flat, and is provided with a strip of adhesive covered fabric 50 (Fig. 8), which is stuck to the right or outer side of the sheath, all along one of the edges of the pattern, but spaced from the edge sufficiently to allow space for the stitching 51.

The adhesive tape 50 preferably consists of a strip of fabric provided with a contact adhesive, such as the narrow masking tape which is used by painters. Its length is such that it projects from both ends of the tie pattern for convenient access after the sheath has been stitched.

In one embodiment of the invention the masking tape 50 may have adhesive on both sides; and the purpose of this is to permit the sheath 40 to be folded over with its edges 52 that are to be stitched in alignment; and both sides of the sheath will then engage the adhesive on both sides of the masking tape 50, thus holding the sheath even more securely than if it had been basted.

It is now ready to be sewed and may be sewed on an ordinary sewing machine along the line 51 from the point 53 (Fig. 8) to a corresponding point at the other smaller end of the tie. The sheath has now been sewed, but it is inside out; and the next step is to turn it right side out.

This is accomplished very quickly, as shown in Fig. 9, as follows:

The sheath is turned back upon itself with its end portion outwardly, as shown in Fig. 9. The operator then has only to pull on the portion 41 and the upper end 54 of the masking tape 52. As the masking tape is withdrawn, it comes loose from the inside of the sheath, which is the right side; and it exerts a pull on that portion of the sheath 55, which is just inside the rim 56 in Fig. 9.

Thus the masking tape can be used over and over again; and it has the advantage that it does not mar the surface of the tie, but it enables the maker to turn the tie inside out in a few seconds.

In other embodiments of the invention the masking tape has adhesive only on one side, in which case the operator has to hold the upper fold of the sheath in alignment with the edge 52 of the lower fold during the stitching.

After the sheath has been turned inside out and the masking tape has been wholly removed, the tie should be laid with its face down and its seam uppermost; and it should be pressed with a steam iron or with an ordinary iron and a damp cloth, progressing along the seam with the point of the iron, and maintaining the seam substantially in the center in the back of the tie. It is immaterial in which direction the inner loose edges of the seam turn; and actually it will be found that they turn to one side.

Referring to Fig. 11, this shows the method of insertion of the spreader in the tie sheath 40, which in this case has no other liner. The spreader 55 is complementary in shape to the inside of the sheath; but the sheath, being tapered, and its larger end being the only important one, if the spreader is too small, it nevertheless fits when pulled up farther in the sheath.

If the spreader is too wide or too long, it can be cut off at its larger end to fit any tie.

The spreader is preferably of such length and width that it goes down into the space between the rear facing 49 and the front of the sheath at each end of the tie and fits against the edges of the tie substantially along the entire length of at least the tapered portions.

The smaller tapered portion may then be rolled into a tubular or conical shape, as indicated at 56. This portion naturally shapes itself conically, and may be so held by means of a small rubber band, forming a needle portion 56. The effectiveness of this needle portion 56 may be greatly enhanced by inserting a stylus 57 having a sharply pointed conical end, such as an ordinary sharpened pencil.

By means of the stylus 57 the spreader 55 may then be pushed into the larger end of the tie until the end portion 56 reaches the smaller end of the tie and comes out above the rear facing.

The stylus is then removed, and the conical end portion 56 is cut off, and the spreader is pulled up into the tie until it engages with its edges against the inside of the edges of the sheath, and spreads the sheath into a smooth, unwrinkled condition.

The larger ends of the spreader 55 are then inserted behind the facings 49, where they keep all parts of the tie in a smooth condition; and whenever the tie is removed, the spreader, being loose, may again be pulled at its smaller end to remove wrinkles.

Referring to Fig. 14, this is a view similar to Fig. 8, showing a preferred embodiment of the invention, in which 60 indicates the pattern for the necktie of suitable fabric, which tapers to a narow portion 61 about the neck, and is again enlarged at its smaller end 62.

The necktie pattern of fabric is folded over with its finished side 63 inside, and the fold is made along the line 64, bringing the two edges 65 and 66 into registry along the full length of the tie.

For the purpose of holding these edges in registry, a basting member 67 is provided, which may comprise a thin thread of cotton impregnated with a contact adhesive and laid along the inside of the sheath, engaging both of the folds of the pattern.

The thread 67 differs from the contact adhesive masking tape previously described in that it is impregnated on all sides and is very thin, and has only a line contact with the surface of the fabric, so that it may separate easily from the fabric.

The thread 67 has its ends 68 and 69 extending beyond the ends of the tie, and the thread is preferably disposed midway between the registering edges 65—66 and the folded edge 64, so that the contact adhesive thread 67 extends down the middle of the tube. This produces a better inverting action because there is less tendency for the basting member 67 to slide laterally on the fabric, as may happen when it is disposed close to the edge, as shown in Figs. 8 and 9.

There is less strain on the stitching during the inversion of the tie because the pull is directly away from the contact adhesive thread as the tie folds backward.

The two folds having the edges 65 and 66 in registry may then be secured together by a line of stitching 70, running the full length of the sheath and forming it into a tube.

Fig. 13 shows the beginning of the inversion of the sheath, with the contact adhesive thread 67 being pulled upward, and the finished sheath 71 being pulled downward and being inverted along the fold 72, as the sheath pulls away from the contact adhesive thread 67 at 73.

In this case the strain on the tie is spaced from the line of stitching 70, which is less likely to be ripped apart when fragile fabrics are used.

Fig. 14 shows the completed sheath right side out after having been inverted and provided with linings 74 and 75 at both its ends, but having no filler; and Fig. 17 shows a filler located to be inserted in the sheath 71.

The filler 75 may comprise a single tapered strip of flexible plastic film of any of the materials described or it may be composed of a laminated member having a multiplicity of layers 76, each of which may be a few thousandths of an inch in thickness; and the composite filler 75 may thus be made as stiff as desired by the user of the tie.

While the filler 75 is flexible, it is sufficiently stiff so that its lateral sides 77, which are tapered to fit the tie, engage the side of the folded sheath at 78; and when a suitable tension is exerted on the small end 79 of the filler, the filler is wedged into the sheath, spreading out and removing all wrinkles.

In order to save material, filler 75 may be made in two pieces, the large tapered piece 80 and the small narrow piece 81, which is of the same width throughout and narrow enough to pass through the narrowest portion 61 of the sheath easily.

These two portions 80, 81 of each layer may be separately stitched or sealed together by heat treatment at the overlapping portion 82, thereby saving material, as the tapered portions may be cut out of one pattern side by side; and the same may be done with the narrow portions.

Each of the narrow portions 81 preferably has an aperture 83 at its extreme end 79, the aperture being small enough so that it may be received on the point 84 of a pencil; but it will not pass the body 85 of the pencil. Thus the pencil may be employed as a removable needle for shoving one or more of the fillers simultaneously into the sheath 71 to complete the tie.

The filler 75 is preferably arranged so that its small end may be pulled at any time to remove the wrinkles; but it may be held in place thereafter by a small safety pin 86, pinned through the smaller part of the tie and filler simultaneously.

The present method of seaming and inversion of hollow articles is applicable to other articles than neckties; and Fig. 18 shows the application of this method of basting and inversion to plastic articles, such as in inflatable horse 90, made of flexible film, such as vinylite.

In this case two identical patterns 91 for the neck and head are first cut out of the film and are laid in registry, one upon the other, and held there by the thread 92, impregnated with contact adhesive, and serving as a basting member all around the outline of the head between the two pieces 91, except at the open bottom 93.

A seam 94 is then produced by an electronic heat sealing machine, such as that manufactured by the Singer Sewing Machine Company, securing the two edges of the head patterns 91 together along their full edge, except the bottom 93.

Referring to Fig. 17, a pair of similar body patterns 95 of vinylite film, except the top body member 95, has neck aperture 96, while the bottom body member 97 has no neck aperture. Both of these body patterns comprise elongated oval members having sides 98 and 99 and rounded ends 100, 101, and both have a central aperture 102 at the saddle point for the supposed rider or swimmer.

The open bottom 93 of the horse's head is then overlapped with the edge of the neck aperture 96, and held in place by a thread 103 of contact adhesive, while the neck is sealed to the body by heat sealing the plastic along the seam 104.

The upper and lower body members 95, 97 have their outer edges 98—101 placed in registry and held by a contact adhesive thread 105, while a heat sealed seam is produced at 106 outside the thread.

The heat sealing around the body aperture 102 is omitted at this time and the inflatable body, neck, and head of the horse may be turned inside easily by pulling out the contact adhesive threads, inverting the hollow horse at the loose edges 102 in the same manner as the inversion of a tie is accomplished.

The body may be provided with an inflatable flap valve 107 on the inside of the head for retaining the air which is blown through the aperture 108. The loose edges surrounding the aperture 102 are then held in registry by a contact adhesive thread 109; and they are heat sealed together along the line 110, completely closing the inflatable body of the horse, which should preferably simulate a horse's body as closely as possible.

A kind of plastic necktie may also be constructed by using a plastic sheath and heat sealing the edges along the line 70 instead of stitching.

It will thus be observed that the present methods of basting and inversion are applicable to other hollow articles than neckties; and the invention is capable of a universal application.

Referring to Figs. 18–29, these are views showing alternative ways of making four-in-hand ties, which are covered by an allowed generic claim, and should be covered by specific claims in this application.

Referring to Figs. 30–42, these are views relating to the making of bow ties, for which the method may also be used.

Fig. 18 is a fragmentary sectional view, showing the structure of a tie in the course of its making, of the type of Fig. 12, in which 120 indicates the pattern of tie material, which is turned with its face inside in this figure, and which contacts the opposite sides of the contact adhesive coated thread 121, holding the inverted sheath in the same manner as it would be held by basting thread, but more securely.

One of the most important advantages of the present method of making ties is that the rough edges of the sheath may be stitched together by means of a sewing machine, thus securing them more permanently and with less labor.

It is a fact that most sewing machines engage the work material with a fixed shoe above; and the material is fed under the fixed shoe to cause it to progress as the stitching is accomplished. The feeding is done by a toothed member engaging the cloth below the shoe and rising periodically to engage the cloth and push it backward.

This results in a drag on the top layer and a push on the bottom layer, which tends to make them move relative to each other and to come out uneven at the end of the stitched material. Basting with thread tends to keep the edges even; but basting with the contact adhesive thread positively insures the ends of the stitching against coming out unevenly.

In Fig. 18, after the basting by means of the contact adhesive thread 121, the rough edges are stitched with a sewing machine, as indicated by the line of stitching 122; but the ends of the four-in-hand tie are left open, as shown in Fig. 8.

Figure 28:
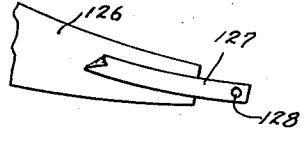
Fig. 28 is a fragmentary elevational view of a fabric liner equipped with an apertured strip of binding tape, so that the fabric liner may be drawn into a sheath.
Figure 29:
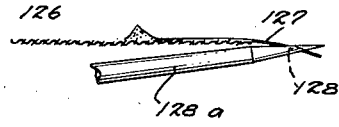
Fig. 29 is a fragmentary side elevation view of Fig. 28, but also includes a pencil.

In all of the modifications shown in Figs. 18–27 the tie is inverted after the manner shown in Fig. 9 and then provided with a filler, as shown in Fig. 11 or in Figs. 28 and 29; but the extra filler may be omitted when a filler is stitched in, as shown in Figs. 23–27.

Figure 19:
Fig. 19 is a similar view of a modification using a strip with contact adhesive on one side.
Figure 24:
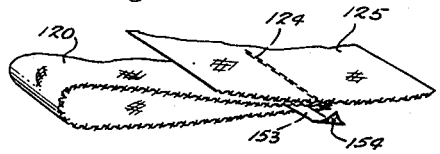
Fig. 24 is a similar view like Fig. 19, except that it includes a fabric liner.

Fig. 19 is a view similar to Fig. 18, showing the tie material with a facing inside and provided with an inverting strip 153 of strong fabric or plastic, such as a rug binding tape, which has contact adhesive 154 on one side. Such a strip serves equally well for inverting the tie, as shown in Fig. 9, but does not serve as a basting member.

The next step is stitching along the line 122, after which the tie is inverted.

Figure 20:
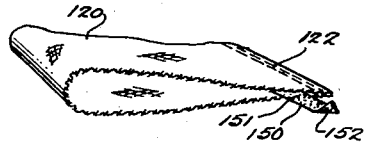
Fig. 20 is a similar view of a modification using a strip with contact adhesive on both sides.
Figure 25:
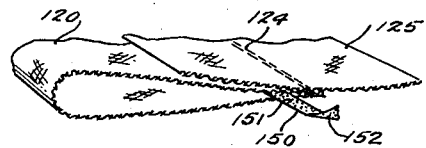
Fig. 25 is a similar view like Fig. 20, except that it includes a fabric liner.

Fig. 20 shows another modification in which the tie material 120 is folded over on itself to engage the inverting strip 150, which has contact adhesive on both sides 151 and 152, and therefore serves to hold the parts of the sheath 120 in position while the stitching is accomplished.

The inverting of the sheath after it is in the position of Fig. 20 is accomplished on the same way as described with respect to Fig. 13.

Figure 21:
Fig. 21 is a similar view of a modification using a strip which is secured to the face of the sheath by stitching.
Figure 26:
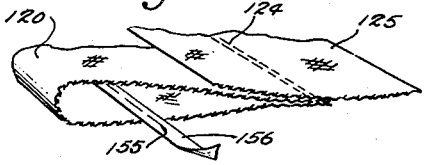
Fig. 26 is a similar view like Fig. 21, except that it includes a fabric liner.

Referring to Fig. 21, this is a modification in which the reversing strip 156 is stitched to the face of the sheath 120 before it is folded over; and the stitching is indicated at 155. The reversing strips in every case must be strong enough to resist the pull without tearing; and I have found that the strip 156 may be a narrow strip of the material used for binding carpets, which has a layer of plastic on one side that is adhesive when heated; but in the present instance merely serves to make the strip stronger.

In every case where stitching is used on my inverting strip, the stitching must be weak enough to be ripped out; and this may be accomplished by using the longest stitch possible on the sewing machine and by using very weak thread, such as No. 140 silk, and also by making a short run of stitching and then a space and then another short run of stitching throughout the length of the strip.

In other words, the attachment of the inverting strip does not have to be continuous; but it may comprise spaced points of attachment, such as spaced runs of stitching.

The important point is that when the tie is being inverted, as in Fig. 13, the next point on the inverting thread 67 must be attached to the inside of the inverted sheath below the rim 72, where it is being inverted, but not far enough to cause the sheath to bunch up. A cord may be stitched after the manner of Fig. 21, the stitching passing through the cord.

Figure 22:
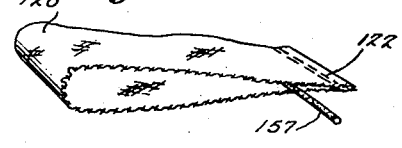
Fig. 22 is a similar view of another modification in which the strip is secured by stitching.
Figure 27:
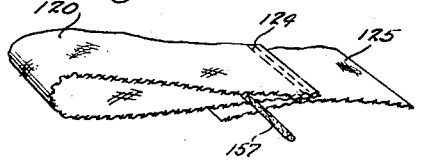
Fig. 27 is a similar view like Fig. 22, except that it includes a fabric liner.

Fig. 22 is a view similar to the preceding views, with the sheath 120 folded over and held by a contact adhesive cord 157, which is preferably spaced inwardly from the edges, where the stitching 122 is placed.

When the ties made according to Figs. 18–22 have been inverted and pressed with the seam centrally down the back, they are empty sheaths; and if the fabric is sufficiently heavy, they need no filler; but it is customary in the trade to provide a filler of a fabric type; and Figs. 23–27 are in every way similar to Figs. 18–22, except that the fabric filler 125 is stitched down its center along the line of stitching 124 and secured to the stitched sheath at the same time that the usual stitching is made along the rough edges.

Inclusion of such a filler 125 increases the difficulty of inverting the tie because the narrow sheath and filler must pass through the narrow neckband portion 61 (Fig. 12) of the tie. It is preferable to do the reversing beginning at the large end of the tie because then it is the smaller end 62 which must pass through the narrow neckband 61.

Therefore, it is preferable to make the usual neckband wider than is the usual custom, to make the inverting easier, even when the filler 125 is secured to the inverted tie, as shown in Figs. 23–27.

It is a fact that manufacturers of ties prefer to use conventional structures as much as possible; and the present ties may be filled with a plastic filler of the type shown in Fig. 12 or they may be filled with the usual fabric 126 (Fig. 28) cut to fit the inside of the sheath, and provided at its end with a U shaped member 127 of contact adhesive having a hole 128 for the pencil 85 (Fig. 15), which is used as a stylus.

Such a fabric filler does not have the advantage of positively preventing wrinkling nor the advantage of engaging the inside of the sheath and spreading out the wrinkles; but it may meet the approval of manufacturers and users who prefer a fabric filler.

Fig. 29 shows a stylus 128a in the member 127 in position to thread the fabric filler 126 into a sheath. Member 127 may be discarded or removed after the filler is in place; and a tiny safety pin through the neckband and filler may hold the filler in adjusted position.

The present invention is equally adaptable to bow ties, the sheath of which is distinguished by being closed at both ends, as shown in Fig. 31; and Figs. 30–42 relate to the making of bow ties.

Figure 30:
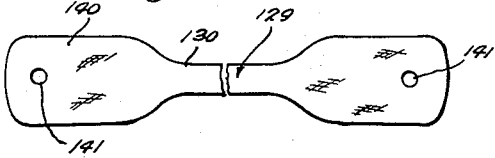
Fig. 30 is a fragmentary plan view of a filler for a bow tie.

Fig. 30 shows the removable filler which is insertable after the sheath is completed, and which may be of flexible plastic or of fabric of any kind, depending upon the thickness desired. The flexible plastic has the advantage of resisting and preventing wrinkling.

The bow tie filler 129 has a neckband portion 130 and a pair of wider end portions 140, which are longer than they are shown in Fig. 30, since they are the parts of which the bow is formed. The apertures 141 are used with a stylus, as shown in Fig. 29, for inserting this filler. The sheath of a bow tie shown in Fig. 31 in the inverted position, with the face of the tie material inside, is indicated at 146; and it comprises two pieces of bow tie material cut to the pattern of Fig. 31 and laid face to face with the tension members 148 and 149 inside and secured to one of the faces.

The pattern of tie material, comprising the two layers 142 and 143 are first provided with the tension members 148, 149 and then stitched all around the edge, as indicated at 145, except at one side of the neckband at 147. Here the tension inverting members 148 and 149 project as indicated at 150; and the opening must be large enough to pass that portion of the tie which is being inverted.

By pulling on the member 148, while turning back that end of the sheath after the manner illustrated in Fig. 9, one end of the bow tie sheath can be turned inside out so that the face is on the outside. Then the other end is inverted in the same way.

After both ends of the bow tie have been arranged with the face of the fabric on the outside, the bow tie is pressed, care being taken to make sure that the edge fold extends along close to the seam 145. The filler 129 may then have a stylus inserted in the aperture 141 in either end portion 140; and one end of the filler is inserted in one end of the sheath. Thereafter the other end of the filler is inserted in the other end of the sheath and smoothed out. The ends of the bow tie may be rounded or right angles or hexagonal; and the filler is of the same shape.

The raw edges along the opening 147 are then turned inward in alignment with the seam 145; and the opening 147 is sewed shut with a sewing machine. A multiplicity of lines of stitching may then be placed along the neckband portion only, through the sheath and filler, to hold the filler in fixed position.

Referring to Fig. 32, this is a sectional view on the line 32—32 showing the sheath after it has been inverted, with the seams on the inside and the face of the tie material on the outside.

Referring to Fig. 33, this is a similar view when the bow tie has been provided with a fabric filler.

Referring to Figs. 35, 37, 39, and 41, these are fragmentary views showing the use of an inverted member 149 of thread covered with contact adhesive masking tape 151 with contact adhesive 153 on one side, double faced tape with contact adhesive 152, 153 on both sides, and strong tape 154 weakly stitched to the face of the tie material, respectively.

Referring to Figs. 36, 38, 40, and 42, these are views similar to those just described, but provided with a fabric filler 156, which is stitched along one edge of the inverted sheath of Fig. 31 by the same line of stitching 145.

Upon describing these figures, an error is noted in that the filler must be stitched at its extreme edge to the sheath along the stitching 145, instead of locating the filler to be stitched down its middle. This requires also that the outline of the filler along that edge conform to the outline of the sheath.

It will thus be observed that there are at least five effective methods of using such a tension member to reverse a tie sheath with or without a filler and that bow ties may be made according to the method, and either type of tie may be filled with a movable plastic or a movable fabric filler.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States, is:

1. The method of making a necktie, which comprises cutting a pattern out of suitable flexible material for the tie, laying a thread impregnated with contact adhesive along the face of the tie material at a point spaced from one of the edges, folding the tie material over with its finished side on the inside, engaging said contact adhesive thread with the edges in registry, joining the edges of the tie by means of a seam, and progressively inverting the tie sheath by pulling in one direction on the partially inverted sheath and in the other direction on the contact adhesive thread until the tie is turned right side out.

2. The method of making ties which comprises cutting a sheath pattern on the bias, attaching adhesively a tension member throughout the length of the said member to the face side of the pattern adjacent one edge, but spaced sufficiently to allow for stitching, thereby momentarily stiffening the edge, laying the other edge of the pattern over said tension member, with the edges in juxtaposition, and stitching the edges together outside of the tension member, turning the tubular sheath backward outside itself at one end and pulling on the outside portion, and pulling on the tension member, to turn the sheath right side out and to remove the tension member, and thereafter pressing the sheath with its face downward and its seam upward, to locate the seam substantially in the middle of the back of the tie, and inserting a filler having a taper corresponding substantially to the taper of the larger end of the sheath by sliding it endwise in the larger end of the tie until the filler engages with its edges against the inside of the sheath to spread it into a smooth and unwrinkled condition by wedging action.

3. The method of making ties which ocmprises making a tie pattern of tie material which tapers inwardly from both ends to a narrow neck band portion, one of said ends being wider, securing a tension member throughout the full length of said member to the facing side of the tie in such manner that it will be inside the sheath when it is inside out, bringing the lateral edges of the tie material into substantial registry, stitching these edges together with the tie inside out, and progressively separating the tension member throughout its full length from the inside of the tubular sheath so formed by turning the sheath backward upon itself at one end, and simultaneously pulling upon the backwardly turned end and the tension member until the sheath is turned inside out.

4. The method of making ties which comprises stitching a rear facing to each of the ends of a tie pattern which tapers inwardly from both ends to a narrow neck band portion, one of said ends being wider, securing a tension member throughout the full length of said member to the facing side of the tie in such manner that it will be inside the sheath when it is inside out, bringing the lateral edges of the tie material into substantial registry, stitching these edges together with the tie inside out, and progressively separating the tension member throughout its full length from the inside of the tubular sheath so formed by turning the sheath backward upon itself at one end, and simultaneously pulling upon the backwardly turned end and the tension member until the sheath is turned inside out, and thereafter inserting longitudinally a liner from the larger end of the tie, said liner having substantially the same taper as the inside of the sheath at the wider portion thereof for the purpose of effecting a substantially complete filling of the sheath from edge to edge.

5. The method of making ties which comprises stitching a rear facing to each of the ends of a tie pattern which tapers inwardly from both ends to a narrow neck band portion, one of said ends being wider, securing a tension member throughout the full length of said member to the facing side of the tie in such manner that it will be inside the sheath when it is inside out, bringing the lateral edges of the tie material into substantial registry, stitching these edges together with the tie inside out, and progressively separating the tension member throughout its full length from the inside of the tubular sheath so formed by turning the sheath backward upon itself at one end, and simultaneously pulling upon the backwardly turned end and the tension member until the sheath is turned inside out, and thereafter inserting longitudinally a liner from the larger end of the tie, said liner having substantially the same taper at the inside of the sheath at the wider portion thereof for the purpose of effecting a substantially complete filling of the sheath from edge to edge, the said filler being of flexible, yet sufficiently stiff, plastic sheet material so that a longitudinal pull on the smaller end of the filler effects a mechanical spreading of the sheath to remove wrinkles.

6. The method of making ties which comprises stitching a rear facing to each of the ends of a tie pattern which tapers inwardly from both ends to a narrow neck band portion, one of said ends being wider, securing a tension member throughout the full length of said member to the facing side of the tie in such manner that it will be inside the sheath when it is inside out, bringing the lateral edges of the tie material into substantial registry, stitching these edges together with the tie inside out, and progressively separating the tension member throughout its full length from the inside of the tubular sheath so formed by turning the sheath backward upon itself at one end, and simultaneously pulling upon the backwardly turned end and the tension member until the sheath is turned inside out, and thereafter inserting longitudinally a liner from the larger end of the tie, said liner having substantially the same taper as the inside of the sheath at the wider portion thereof for the purpose of effecting a substantially complete filling of the sheath from edge to edge, the said filler being of sufficient stiffness to spread the sheath into two smooth, unwrinkled layers, and being maintained in a loose and slidable condition in the sheath, for wedging spreading movement at any time.

7. The method of making ties which comprises cutting a sheath pattern of tie material on the bias, attaching adhesively a member of tension material throughout the length of said member to the face side of the pattern adjacent one edge, but spaced sufficiently to allow for stitching, thereby momentarily stiffening the edge, laying the other edge of the pattern over the said tension member with the edges in juxtaposition, stitching the edges together outside of the tension member and removing the tension member by pulling it progressively from the inside of the stitched pattern, while pulling backwardly on the same end of the pattern to turn the pattern inside out.

8. The method of making a necktie, which comprises making a pattern of tie material provided with two end portions and a central neck band portion, securing a tension member to the facing side of the tie material in such manner that the tension member is successively detachable from the tie material by a pull on one end of the tension member opposed by a pull on the tie material, placing the tie material upon itself to form a sheath with the face and tension member inside, bringing the edges of the pattern into substantial registry with each other, stitching the edges of the tie material together with the sheath inside out, and inverting the sheath by pulling on the tension member at one of its ends, while also pulling on the adjacent open part of the sheath in a reversing direction until the sheath is turned inside out.

9. The method according to claim 8 in which the securing of the tension member is done by stitching the tension member with weak stitching to the tie material so that the stitching may be ripped to detach the tension member and reverse the sheath.

10. The method according to claim 8, in which the securing of the tension member is done by pressing a strip with contact adhesive on one side against the tie material.

11. The method according to claim 8, in which the securing of the tension member is done by pressing parts of the sheath against the two sides of a strip which is coated with contact adhesive on both sides, and which also holds the sheath in position to be stitched.

12. The method according to claim 8, in which the securing of the tension member is done by pressing a contact adhesive covered thread between the parts of the sheath to hold the sheath while stitching and permit its reversal by pulling out the thread.

13. The method of making a bow tie according to claim 8, which comprises also arranging a second tension member in the other end of the sheath with both tension members having an end accessible at an opening in the neck band portion, and in which the sheath is stitched about its periphery except at said opening, and inverted by pulling on said tension members separately to reverse the sheath through said opening.

14. The method of making a bow tie according to claim 13, in which the empty sheath is provided with a filler conforming to the shape of the inside of the sheath and inserted through said opening by applying a stylus to each end of the filler.

15. The method of making a tie according to claim 8, in which the tie is provided with a filler conforming to the shape of the inside of the sheath by threading a separate loose filler into an opening in the sheath and pulling on the filler until it is fitted in the sheath.

16. The method of reversing a hollow member of flexible material having an inner face and an opening and having a tension member secured to said inner face of said hollow member and having an end of said tension member accessible through said opening, which comprises pulling backward and outward on a portion of the material adjacent said opening and pulling in the opposite direction upon said tension member, the said tension member progressively pulling out the inside of said hollow member and separating from the inner surface of said flexible material adjacent said opening as the hollow member is turned inside out.

17. The method of reversing hollow members according to claim 16, in which the tension member is attached to the inner face at one side of the tension member by contact adhesive.

18. The method of reversing hollow members according to claim 16, in which the tension member is attached to the inner face of the article at two sides of the tension member by contact adhesive.

19. The method of reversing hollow members according to claim 16, in which the tension member is weakly stitched to the inner face to be ripped off during said reversal.

20. The method of reversing hollow members according to claim 16, in which the contact adhesive is carried by a tension thread, covered with contact adhesive overall, but adhering to the inner face along a single line of contact.

21. The method of reversing hollow members according to claim 16, in which the tension member comprises a tension thread impregnated with contact adhesive overall and adhering to the inner face of the member along two lines of contact.

22. The method of making a hollow article formed of sheet material, which comprises laying a double faced contact adhesive tension member on the face of a piece of flexible material adjacent an edge of said flexible material and laying another face of said flexible material with its edge adjacent the first mentioned edge, and applying a line of stitching securing said edges together while the flexible material is held in place by said adhesive tension member against the other face of contact adhesive.

23. The method of basting according to claim 22, in which the tension member is a twisted thread impregnated and covered with contact adhesive on all sides.

24. The method of making a hollow article, comprising forming a plurality of pattern members of flexible material having edges to be secured together, placing an adhesive tension member on one of the faces of said pattern members, securing the said edges together to form the hollow article, and turning the hollow article inside out by pulling in one direction on the flexible tension member, and pulling backward in the other direction on the hollow article at an aperture therein, separating the tension member from the hollow article progressively at the points where the hollow article is turning inside out.

25. The method of making a hollow article according to claim 24, in which the flexible material is made of plastic and the edges are secured together by heat sealing the edges together.

26. The method according to claim 24, in which the tension member comprises a thread carrying contact adhesive adapted to hold the edges in the desired position while the edges are secured together.

References Cited in the file of this patent

UNITED STATES PATENTS

| | | |
|---|---|---|
| 1,577,564 | Coplan | Mar. 23, 1926 |
| 1,651,039 | Overbeke | Nov. 29, 1927 |
| 1,741,232 | Hall | Dec. 31, 1929 |
| 2,126,836 | Steinberger | Aug. 16, 1938 |
| 2,174,966 | Campagnoli | Oct. 3, 1939 |